S. L. GARTLAN.
PROCESS FOR THE TREATMENT OF PETROLEUM OILS.
APPLICATION FILED MAR. 17, 1919. RENEWED JAN. 28, 1922.
1,430,977.
Patented Oct. 3, 1922.
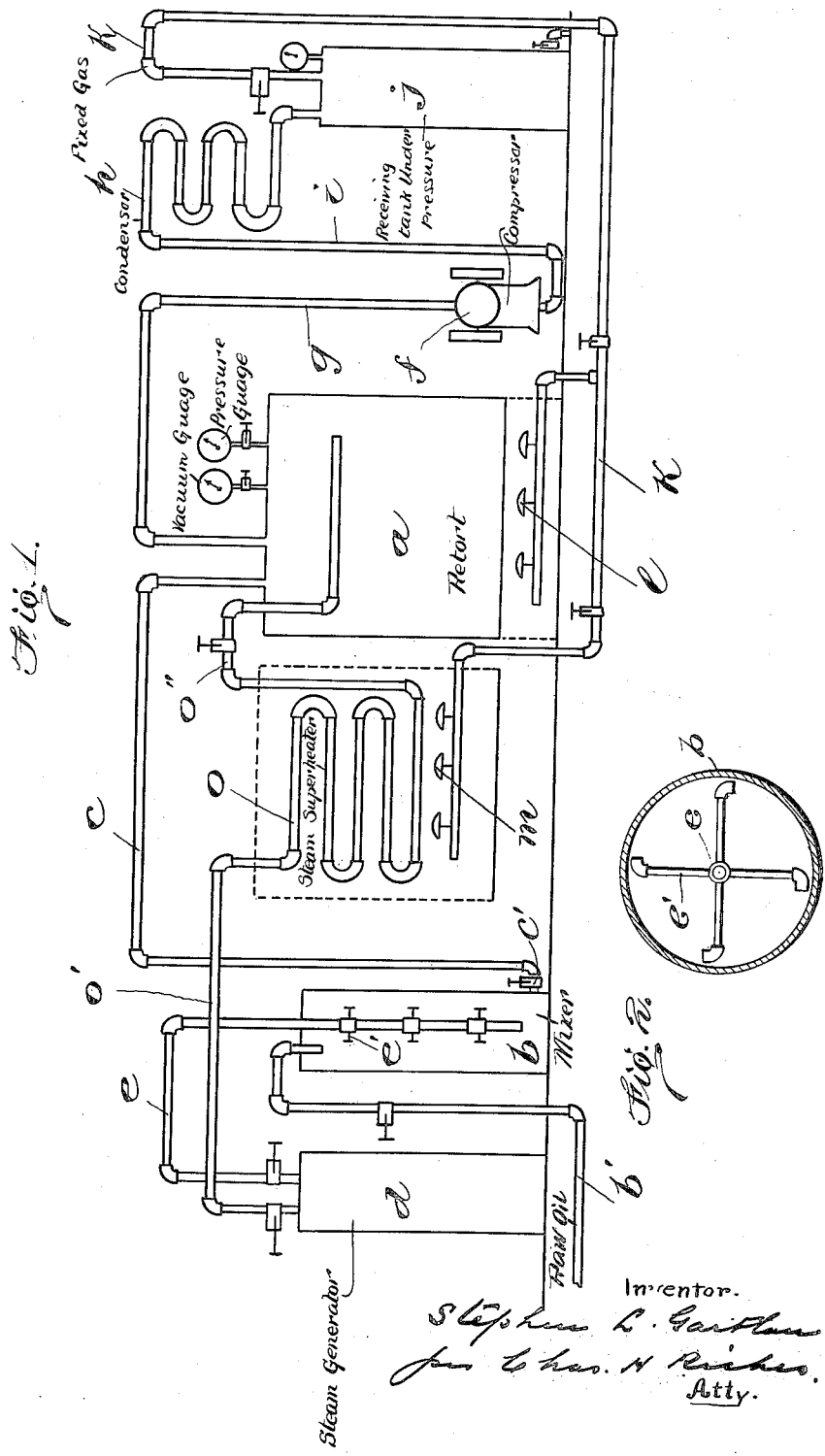
Inventor.
Stephen L. Gartlan
per Chas. N. Riches
Atty.

Patented Oct. 3, 1922.

1,430,977

UNITED STATES PATENT OFFICE.

STEPHEN LOUIS GARTLAN, OF TORONTO, ONTARIO, CANADA.

PROCESS FOR THE TREATMENT OF PETROLEUM OILS.

Application filed March 17, 1919, Serial No. 283,151. Renewed January 28, 1922. Serial No. 532,499.

*To all whom it may concern:*

Be it known that I, STEPHEN LOUIS GART- LAN, a citizen of the United States of America, residing at the city of Toronto, in the county of York and Province of Ontario, Dominion of Canada, have invented a Process for the Treatment of Petroleum Oils; and I hereby declare that the following is a full, clear, and exact description of the same.

This invention relates to a process for converting petroleum oil into hydrocarbon products of less specific gravity than kerosene or kerosene distillate and it consists of subjecting the oil to successive heats increasing in temperature as the boiling point of the residual oil rises, permitting the oil vapors given off at each heat to expand under sub-atmospheric pressure, removing these vapors before the temperature is raised for the next successive heat and continuing the procedure until a cracking temperature is reached, then injecting steam into the oil vapors, compressing the oil vapors given off at the successive heats into liquefied products, and collecting and combining all the products in a common receptacle while still under pressure.

For an understanding of the invention, reference is to be had to the following description and to the accompanying drawings, in which Figure 1 represents a diagrammatic view of an apparatus suitable for the purpose of the invention, and Fig. 2 is a horizontal section through the mixing tank.

Like characters of reference refer to like parts throughout the specification and drawings.

*a* represents the retort, which is preferably of a cylindrical shape and of dimensions suitable for the capacity of the plant.

The retort has a capacity considerably larger than that of the mixing tank. In a plant that I have been operating on the "batch" principle and having a capacity of about twenty barrels to the run, the diameter of the retort, which is made of boiler iron, is ten feet and the height about twelve feet, but these measurements and those given in connection with the other parts may vary within wide limits, and are merely for the purpose of explaining the relations of the receiving tank, retort, and compressor of a plant that is now in operation. I do not desire to be limited to them nor the exact ratio represented thereby.

*b* represents a mixing tank which has a diameter of six feet and a height of ten feet. This tank is connected with the retort *a* by a suitable normally closed, valve controlled pipe *c*, the pipe *c* being about four inches in diameter for the rapid discharge of the mixture from the mixing tank to the retort, and connected to the mixing tank at, or near the bottom thereof, and discharging into the top of the retort *a*.

*d* represents a steam generator of about 125 H. P. This steam generator is provided with a two inch steam pipe *e* extending into the mixing tank *b* and provided with outlets *e'* arranged to so discharge the steam that it imparts a rotary movement to the matter within the tank. The steam pipe *e*, as shown in the drawing, preferably, extends from the top of the steam generator *d* into the top of the mixing tank *b* and downwardly therethrough approximately to the bottom of the tank.

The lower end of the steam pipe *e* is closed to create the necessary pressure through the outlets *e'*, which preferably take the form of hollow arms extending radially from the steam pipe. These arms may either be bent or provided with elbows at their free ends to so discharge the steam as to utilize its pressure to impart the revolving or rotary movement to the mass within the tank, the expansive action of the steam combined with the agitation causing it to emulsify, and the heat of the steam raising the temperature of the mixture. When sufficient steam has been admitted to the mixing tank to raise the temperature of the oil in the tank to 40° centigrade, the valve *c'* is opened and the emulsified mixture is discharged from the mixing tank through the pipe *c* into the retort *b*. When the mixture enters the retort the vapors given off at or below 40° C., immediately separate from the mass, and expand within the retort, to be exhausted therefrom as hereinafter described.

*f* represents a compressor of any suitable type and preferably jacketed for cooling purposes. For ample capacity for a plant of the dimensions previously mentioned, the cylinder is twelve inches in diameter and the piston has a twelve inch stroke. The compressor *f* is connected with the retort by a four inch pipe *g* through which the vapour or gas passes from the retort to the compressor.

*h* represents a refrigerator connected with the compressor *f* by a pipe *i*,

The refrigerator has the form of about six hundred feet of two inch tubing arranged in a serpentine shape, but any other suitable arrangement having approximately the same condensing capacity will answer.

$j$ represents a receiving tank, which has a storage capacity of about two hundred barrels and into which the refrigerator $h$ discharges and $k$ represents a two inch pipe line leading from the top of the receiving tank $j$ to the burners $l$ of the retort $a$ and the burners $m$ of the superheater $o$, this superheater being connected with the steam generator $d$ by a pipe $o'$ and with the retort $a$ by a pipe $o''$.

The oil is introduced into the mixing tank $b$ through the supply pipe $b'$ which is about four inches in diameter and the steam is introduced into the same tank from the steam generator $d$ by means of the steam pipe $e$, the admission of the steam into the mixing tank being by means of the outlets $e'$, which are so arranged as to impart a revolving motion to the matter within the tank, during which, the oil and the steam become intimately mixed. The introduction of the steam into the mixing tank raises the temperature of the matter therein and when it attains 40° centigrade the valve $c'$ is opened and the mixture is discharged from the mixing tank into the retort where the light vapors and fixed gases immediately separate from the mixture. These light vapors and fixed gases then pass from the retort through the compressor and refrigerator to the receiving tank, the condensable vapors being liquefied by the compressor and condenser during their passage. A pressure of approximately 125 lbs. per square inch is maintained in the mixing tank to force the matter, through the pipe, to the retort, until the mixing tank is emptied. The valve $c'$ is then closed to cut off any further supply of steam from this source to the retort. When the light vapors and fixed gases, previously mentioned, have passed from the retort, the burners are lighted and the retort is heated to about 60° C. and the matter in the retort is then converted into vapor and this vapor passes from the retort to the compressor, where it is liquefied by compression or concentration and forced through the refrigerator to the receiving tank, the boiling of the matter in the presence of steam being continued until the whole of it has been converted into vapor and gas.

As a concrete example, it may be assumed that Mexican crude petroleum is being treated, this crude oil, hydro-carbon having an asphaltum base and being recognized as one of the most difficult of the crude petroleums to convert into the lighter hydro-carbons, particularly those of the naptha type. This oil is introduced into the mixing tank $b$, and steam, supplied by the steam generator, is introduced into the mixing tank at approximately 125 lbs. pressure until it is intimately mixed with the crude petroleum, the admission of the steam being continued until the mixture of crude oil and steam attains a temperature of about 40° C. when the fixed gases and light naptha vapors are ready to be given off. The mixture of steam and oil is then forced from the mixing tank into the retort and the supply of steam from the generator into the mixing tank is cut off and no steam, other than that which has been admitted to the retort with the oil to be treated, is permitted to enter the retort until its temperature has been raised to over 300° centigrade. The retort is first heated to about 60° centigrade and at this temperature, light naptha vapours are given off. These naptha vapours pass from the retort to the compressor, which liquefies them and forces them through the refrigerator to the receiving tank.

When the naptha vapours have been given off, the temperature of the retort is raised to about 90° centigrade and, at this temperature, gasoline vapours are given off and pass to the compressor, which, as in the case of the light naptha vapours, liquefies them and forces them through the refrigerating coils while under pressure to the receiving tank.

When the kerosene vapours commence, the temperature of the retort is gradually increased up to 300° centigrade, there being still sufficient uncondensed steam in the mass to convert these vapours into naptha vapours, and these latter vapours pass from the retort through the compressor to the receiving tank as, and for the purpose, previously stated.

When a maintenance of the flow of the vapors is found to require a further raising of temperature above 300° C., steam is introduced from the steam generator through the superheater into the retort, the temperature for superheating the steam being increased to the same temperature as that of the retort, so that, when the steam enters the retort, it will readily break up or combine with the residual matter therein, the temperatures of the superheaters and the retort being gradually increased to correspond with the increase of the boiling point ranges of the residual matter in the retort as the vapours are given off, until the whole of the original content of the retort has been converted into naptha vapours.

In this way, everything, except the fixed gases, is collected in the receiving tank in the form of naptha liquid and the fixed gases are passed over to the burners and utilized as fuel for heating the retort and the superheater.

It has been ascertained in the practical operation of this method of treating hydro-carbon oils, such as asphaltum base crude petroleum, or paraffin base crude petroleum, that at least 75% of the original matter treated can be recovered in the form of a high grade naptha, averaging about 72 Baumé.

The compressor valves at the commencement of the distillation are set for approximately 125 lbs. per square inch compression until the temperature in the retort has been increased to 300° centigrade, after that, the pressure in the compressor is gradually increased according to the increase of the temperature of the retort, the increase of pressure being about 25 lbs. per square inch for every 100° of increase of temperature in the retort.

The action of the compressor operates to produce a sub-atmospheric pressure in the retort and permits of greater and more rapid expansion of the gases and, consequently, the rapid conversion of the matter into vapour.

With the exception of the fixed gases, which are utilized for the heating of the retort and superheater, all of the matter in the retort is converted into liquid, and, in the treatment of the crude petroleum above mentioned, it is estimated that the liquid content of the receiving tank averages about seventy-five per cent of the original hydrocarbon content of the mixing tank.

The term naphtha is to be understood to include in its meaning all hydro-carbon compounds having a lower boiling point range and less specific gravity than kerosene or kerosene distillate.

Having thus fully described my invention, what I claim as new and desire to secure by Letters Patent is:

1. A process for converting petroleum oil into hydrocarbon products of less specific gravity than kerosene or kerosene distillate, which consists of subjecting the oil to successive heats increasing in temperature as the boiling point of the residual oil rises, permitting the oil vapors given off at each heat to expand under sub-atmospheric pressure, removing these vapors before the temperature is raised for the next successive heat, and continuing this procedure until a cracking temperature is reached, then injecting steam into the oil vapors, compressing the oil vapors given off at the successive heats into liquefied products and collecting and combining all the products in a common receptacle while still under pressure.

2. A process for converting petroleum oil into hydrocarbon products of less specific gravity than kerosene or kerosene distillate, which consists of subjecting the oil to successive heats increasing in temperature as the boiling point of the residual oil rises, permitting the oil vapors given off at each heat to expand under sub-atmospheric pressure, removing these vapors before the temperature is raised for the next successive heat, and continuing this procedure until a cracking temperature is reached, then injecting steam into the oil vapors, compressing the oil vapors given off at the successive heats into liquefied products, increasing the compression as the boiling point of the residual oil rises, and collecting and combining all the products in a common receptacle while still under pressure.

3. A cracking process for the production of lower boiling liquid hydrocarbons which consists of vaporizing the liquid hydrocarbon by subjecting it to successive heats increasing in temperature as the boiling point of the residual oil rises, transferring the evolved vapors from the vaporizing zone and maintaining a low pressure in it which enables the evolved vapors to expand and injecting steam into the vapors when a vaporizing temperature for the higher boiling fractions is reached, compressing the transferred vapors given off at the successive heats and collecting and combining all the products of the compression.

4. A cracking process for the production of lower boiling liquid hydrocarbons which consists of vaporizing the liquid hydrocarbon by subjecting it to successive heats increasing in temperature as the boiling point of the residual oil rises, transferring the evolved vapors from the vaporizing zone and maintaining a low pressure in it which enables the evolved vapors to expand, injecting steam into the vapors when a vaporizing temperature for the higher boiling fractions is reached, compressing the transferred vapors given off at the successive heats, increasing the compression as the boiling point of the residual oil rises and collecting and combining all the products of the compression.

Toronto, Ont., February 26th, 1919.

STEPHEN LOUIS GARTLAN.

Signed in the presence of—
CHAS. H. RICHES,
FRANK W. CLARKE.